United States Patent
Benker et al.

(10) Patent No.: US 11,631,882 B2
(45) Date of Patent: Apr. 18, 2023

(54) METHOD OF PRODUCING A TRACTION BATTERY OF A MOTOR VEHICLE AND CORRESPONDING PRODUCTION DEVICE

(71) Applicant: AUDI AG, Ingolstadt (DE)

(72) Inventors: Tobias Benker, Heilbronn (DE); Michael Frauenhofer, Aichach (DE); Oliver Schieler, Gaimersheim (DE); Andreas Buer, Neudenau (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 17/110,708

(22) Filed: Dec. 3, 2020

(65) Prior Publication Data

US 2021/0194036 A1 Jun. 24, 2021

(30) Foreign Application Priority Data

Dec. 20, 2019 (DE) .................. 10 2019 135 381.5

(51) Int. Cl.
*H01M 10/04* (2006.01)
*H01M 50/249* (2021.01)
*H01M 10/625* (2014.01)
*H01M 10/653* (2014.01)
*H01M 50/204* (2021.01)

(52) U.S. Cl.
CPC ..... *H01M 10/0404* (2013.01); *H01M 10/625* (2015.04); *H01M 10/653* (2015.04); *H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0370364 A1* | 12/2014 | Kim | .................. | H01M 50/579 29/730 |
| 2017/0025655 A1* | 1/2017 | Klimek | ................. | H01M 50/24 |
| 2020/0176806 A1* | 6/2020 | Simon | ................. | H01M 10/653 |
| 2020/0266503 A1* | 8/2020 | Hoefner | .................... | F16B 5/02 |

FOREIGN PATENT DOCUMENTS

| | | |
|---|---|---|
| DE | 103 20 186 A1 | 12/2004 |
| DE | 10 2017 128 529 A1 | 6/2019 |
| DE | 10 2018 010 115 A1 | 6/2019 |
| DE | 10 2018 101 543 A1 | 7/2019 |

OTHER PUBLICATIONS

Examination Report dated Apr. 30, 2020 in corresponding German application No. 10 2019 135 381.5; 10 pages including Machine-generated English-language translation.

* cited by examiner

*Primary Examiner* — Gregg Cantelmo
(74) *Attorney, Agent, or Firm* — Maier & Maier, PLLC

(57) ABSTRACT

A method for producing a traction battery of a motor vehicle. A battery housing of the traction battery has a receptacle for receiving a cell module. It is provided that support surfaces for supporting the cell module spaced apart from a bottom of the battery housing are formed on walls of the battery housing delimiting the receptacle compartment, and that a distance between the support surfaces and the base is measured, an amount of heat conducting calculated from the distance is applied to the bottom, and then the cell module is inserted into the receptacle compartment supported on the support surfaces.

17 Claims, 1 Drawing Sheet

METHOD OF PRODUCING A TRACTION BATTERY OF A MOTOR VEHICLE AND CORRESPONDING PRODUCTION DEVICE

FIELD

The disclosure relates to a method for producing a traction battery of a motor vehicle, wherein a battery housing of the traction battery has a receptacle compartment for receiving a cell module. The disclosure furthermore relates to a production device for producing a traction battery.

BACKGROUND

For example, document DE 10 2017 128 529 A1 is known from the prior art. This describes a motor vehicle battery, namely a traction battery of a motor vehicle, having a battery housing which has a housing interior delimited in sections by a housing frame and a housing base, having multiple battery modules arranged in the housing interior, and having at least one first cooling duct formed in the region of the housing base for cooling the battery modules from a first side. The housing interior is delimited opposite to the housing base by a housing cover or by a housing lid, wherein at least one second cooling duct for cooling the battery modules from a second side is formed in the region of the housing cover or the housing lid.

Furthermore, document DE 103 20 186A1 discloses a thermal paste for the thermal coupling of a power semiconductor component to a heat sink. The thermal paste consists of a base material and at least one filler in this case. The individual components have the following properties: a dynamic viscosity of the base material between 25 and 500 mPa·s, at least one filler consists of metal particles, the filler or fillers have a particle size of less than 20 μm, the thermal paste has a degree of filling of the filler(s) between 20 and 70%. This results in a thermal paste having a specific resistance of less than 100 Ωm and a thermal resistance of 3.4 W/(K·m).

SUMMARY

The object of the disclosure is to propose a method for producing a traction battery of a motor vehicle, which method has advantages over known methods, in particular reducing the amount of heat-conducting means required during production.

This object is achieved according to the disclosure by a method for producing a traction battery. It is provided that on the walls of the base housing delimiting the receptacle compartment, support surfaces are formed to support the cell module spaced apart from a bottom of the battery housing, and that a distance between the support surfaces and the bottom is measured, an amount of heat conducting means calculated from the distance is applied to the bottom, and then the cell module is inserted into the receptacle compartment with support on the support surfaces.

The method described is used to produce the traction battery, which is preferably installed as a component of the motor vehicle, but can also be present separately from it. The traction battery is used to temporarily store electrical energy, which is used in particular to operate a drive device or a drive unit of the motor vehicle. The electrical energy stored in the traction battery is thus used to provide a drive torque directed to driving the motor vehicle by means of the drive device or the drive unit.

The traction battery has the battery housing and the at least one cell module. The receptacle compartment, which is provided and designed to receive the cell module, is formed in the battery housing. The receptacle compartment is delimited by the bottom and the walls of the battery housing. The support surfaces, which extend in parallel to the bottom, for example, are formed on the walls. The support surfaces are used to support the cell module after it is arranged in the receptacle compartment. The support surfaces are arranged in such a way that the cell module is spaced apart from the bottom of the battery housing after it is arranged in the receptacle compartment, while it is supported on the support surfaces. In this way, tolerances in the dimensions of the cell module and the battery housing can be compensated for reliably.

The cell module is used for the temporary storage of electrical energy; for this purpose, the cell module has at least one battery cell, preferably multiple battery cells electrically interconnected with one another. Preferably, not only a single cell module is arranged in the battery housing, but there are multiple cell modules in the battery housing. In such a configuration, the battery housing has as many receptacle compartments as there are cell modules, wherein each of the receptacle compartments is delimited by the bottom of the battery housing. In addition, the receptacle compartments are separated from one another by the walls of the battery housing. This means that one of the walls of the battery housing is present between each two of the receptacle compartments. During the production of the traction battery, preferably not only are the cell modules arranged in the receptacle compartments, but the cell modules are also electrically interconnected.

The support surfaces are provided, for example, on fastening elements which extend from at least one wall or from walls of the battery housing. The fastening elements are preferably materially bonded to the wall or the walls, for example adhesively bonded or welded to them. The cell module has counter-support surfaces which, after the cell module has been arranged in the receptacle compartment, press against the support surfaces, in particular press planar or flat, so that the cell module is supported in the receptacle compartment spaced apart from the bottom. In this respect, the cell module does not touch the bottom and is at most indirectly connected to it, namely via the heat conducting means.

During operation of the traction battery, in particular when charging or discharging the traction battery, heat accumulates at or in the cell module, which has to be dissipated at least temporarily in order to prevent an excessively high temperature of the cell module. In addition, it can be provided that the cell module is temporarily heated in order to enable rapid charging or providing a high power. For this purpose, the battery housing is preferably passively or actively temperature controlled, in particular cooled or heated. In the context of passive cooling, at least one heat sink is arranged on the battery housing or the battery housing itself is designed as a heat sink in some regions. In the context of active cooling, it can be provided that the battery housing has at least one coolant duct through which coolant flows at least temporarily during operation of the traction battery. Heating means can additionally or alternatively be provided for heating the battery housing.

For effective temperature control of the cell module, it is necessary to establish a thermal connection between the cell module and the battery housing. For this purpose, the heat conducting means is introduced into the receptacle compartment during the production of the traction battery, namely applied to the bottom. The cell module is then inserted into the receptacle compartment so that on the one hand it is supported on the support surfaces and on the other hand it presses against the heat conducting means. In this respect, the heat conducting means, on the one hand, presses against the cell module and, on the other hand, presses against the battery housing and connects them thermally to one another. This contact on both sides can be produced in the context of pressing or compressing the cell module with the heat conducting means.

For example, a multi-component heat conducting means is used as the heat conducting means, which in this respect consists of at least a first component and a second component. The first component is here, for example, a carrier material and the second component is a filler, wherein the thermal conductivity of the heat conducting means is primarily achieved by means of the filler. For this purpose, the filler preferably has a higher thermal conductivity than the carrier material. The heat conducting means is provided overall in the form of a liquid or a paste. The latter is to be understood as a solid-liquid mixture, wherein for example the first component is provided as a liquid and the second component is provided as a solid. For example, the second component contains or consists of metal particles. The proportion of the second component in the heat conducting means is particularly preferably at least 50%, at least 60%, at least 70% or at least 80%.

The two components can thus be provided in the heat conducting means in a quantitative ratio of 1:1. This achieves particularly good heat conduction with the aid of the heat conducting means. A crosslinking reaction can also be controlled via the selection of the components, due to which the heat-conducting means sets after it has been arranged between the cell module and the bottom.

The amount of heat conducting means to be applied to the bottom can be determined on the basis of the distance between the bottom and the cell module and the area of the bottom. The distance is usually determined according to a maximum gap between the cell module and the bottom, which was determined by means of a tolerance chain analysis. One goal in this case is the adequate and reliable wetting of thermally active surfaces or reliable gap filling after completion of the insertion and fastening of the cell module in the receptacle compartment. However, the actual distance present between the bottom and the cell module is unknown. If the amount of heat conducting means is calculated on the basis of the maximum gap, an unnecessarily large amount of heat conducting means is usually introduced into the receptacle compartment.

For this reason, measuring the distance between the support surface and the bottom before inserting the cell module into the receptacle compartment and calculating the heat conducting means to be introduced into the receptacle compartment from this distance is now provided. This means that the dimensions of the battery housing are precisely determined in the form of the distance between the support surfaces and the bottom of the battery housing, so that the actual distance between the bottom and the cell module provided after the cell module has been inserted into the receptacle compartment only depends on a measurement tolerance when measuring the distance and a dimensional tolerance of the cell module.

In any case, knowing the distance between the support surface and the bottom, the distance between the bottom and the cell module can be estimated with significantly higher accuracy than without the measurement and only knowing the manufacturing tolerances of the battery housing. Accordingly, the amount of heat conducting means to be introduced into the receptacle compartment can be estimated with better accuracy. After introducing the calculated amount of heat conducting means, the cell module is inserted into the receptacle compartment in such a way that it is supported on the support surfaces. Using the procedure described, a significant reduction in the required amount of heat conducting means can be achieved.

One refinement of the disclosure provides that the distance is measured by means of an optical measuring device. The distance is thus determined optically. For example, the measuring device uses an electro-optical distance measurement or a laser distance measurement. A 3D scanner is preferably used as the measuring device. This can in particular use light stripe projection or light stripe topometry. The optical measuring device allows the distance to be determined very quickly, on the one hand, and with high accuracy, on the other hand.

One refinement of the disclosure provides that a camera is used as the measuring device. The camera is designed to capture an item of depth information of the recorded image for this purpose. A 3D camera is preferably used in this respect. For example, the camera measures the distance between the support surface and the bottom using a runtime method. The use of the camera in turn enables extremely fast and accurate measurement of the distance between the support surface and the bottom.

One refinement of the disclosure provides that the distance is calculated from a first distance between the measuring device and the bottom and a second distance between the measuring device and the support surface. Correspondingly, different distances are first measured with the aid of the measuring device, namely the first distance and the second distance. In this case, the first distance is between the measuring device and the bottom and the second distance is between the measuring device and the support surface. The distance is then determined by forming the difference between the first distance and the second distance, in particular the distance is obtained by subtracting the second distance from the first distance. This procedure, in turn, enables the distance to be determined particularly quickly and accurately.

One refinement of the disclosure provides that the amount is calculated from the distance and an area of the bottom. The amount of heat conducting means to be introduced into the receptacle compartment results as a function of the distance and the area of the bottom, in particular the area of the bottom which is to be wetted using the heat conducting means. As a result, the required amount of heat conducting means is provided with significantly higher accuracy than with other methods.

One refinement of the disclosure provides that the application of the heat conducting means is carried out by means of an application device moving at a specific speed over the bottom, wherein a heat conducting means throughput of the application device is set in such a way that the calculated amount of heat conducting means is applied to the bottom, in particular having a constant layer thickness. The application device can, for example, be a nozzle or have a nozzle. The application device is provided and designed in particular for applying the heat conducting means in the form of a heat conducting means bead. The thickness of the heat conducting means layer applied to the bottom is determined, on the one hand, by the speed at which the application device is moved over the bottom. On the other hand, it is dependent on the heat conducting means throughput with which the heat conducting means is discharged from the application device and applied to the bottom.

It is now preferably provided that the speed of the application device is predetermined and constant or at least follows a fixed predetermined speed profile. Accordingly, the amount of heat conducting means is adjusted via the heat conducting means throughput. For this purpose, the heat conducting means throughput is calculated from the calculated amount of heat conducting means and the speed, which ensures the application of the calculated amount of heat conducting means to the bottom. The calculated heat conducting means throughput is then set on the application device. For example, it is provided that the heat conducting means is applied to the bottom having a constant layer thickness or as a heat conducting means bead. In the case of application as a heat conducting means bead, the heat conducting means is compressed during the insertion of the cell module into the receptacle compartment and a heat conducting means layer forms between the cell module and the bottom. The procedure described ensures the provision of the heat conducting means between the bottom and the cell module with high process reliability.

One refinement of the disclosure provides that the heat conducting means throughput is set higher at the beginning and at the end of the application than between these times. Within a certain period of time after the beginning and a certain period of time before the end of the application, a different heat conducting medium throughput is thus selected than between these periods of time. Additionally or alternatively, the speed can be set lower at the beginning and at the end of the application than between these times. Both of these result in the application of a larger amount of heat conducting means at the beginning and at the end of the application so that the layer thickness is greater there, for example, than in between. Additionally or alternatively, a larger area of the bottom is wetted at the beginning and at the end of the application than in between. This results, for example, in a type of bone shape of the applied heat conducting means. This ensures a particularly good thermal connection of the cell module to the battery housing.

One refinement of the disclosure provides that the receptacle compartment is part of multiple receptacle compartments of the battery housing, wherein the distance between the respective support surfaces and the bottom is measured and the amount of heat conducting means is calculated separately for each of the receptacle compartments. In this respect, the battery housing does not only have a single receptacle compartment, but rather multiple receptacle compartments. The statements directed to the receptacle compartment in the context of this description are preferably transferable to each of these multiple receptacle compartments. It is furthermore preferred to arrange one of multiple cell modules in each of these receptacle compartments. Since the distance between the support surfaces and the bottom can be different from one another for the multiple receptacle compartments, the distance is to be measured separately for each of them.

One refinement of the disclosure provides that the speed is set to be the same for the multiple receptacle compartments and the heat conducting means throughput for each of the receptacle compartments is calculated and set separately from the respective required amount of heat conducting means. Even if different amounts of heat conducting means result for the multiple receptacle compartments, the speed at which the application device is moved over the bottom is set to be the same for the multiple receptacle compartments or follows the same speed profile. The adaptation of the amount of heat conducting means applied to the bottom is therefore adapted solely by corresponding selection of the heat conducting means throughput. In this way, an existing production device can be equipped in a special way for the procedure explained in the context of this description.

The disclosure furthermore relates to a production device for producing a traction battery of a motor vehicle, in particular for carrying out the method according to the statements within the scope of this description, wherein a battery housing of the traction battery has a receptacle compartment for receiving a cell module. It is provided that on the walls of the battery housing delimiting the receptacle compartment, support surfaces are formed for supporting the cell module spaced apart from a bottom of the battery housing, and that the production device is provided and designed to measure a distance between the support surfaces and the bottom, to apply an amount of heat conducting means calculated from the distance to the bottom, and then to insert the cell module into the receptacle compartment with support on the support surfaces.

The advantages of such a design of the production device or such a procedure have already been discussed. Both the production device and also the method for its operation can be refined according to the embodiments in the scope of this description, to which reference will therefore be made.

BRIEF DESCRIPTION OF THE FIGURES

In the following, the disclosure will be explained in greater detail with reference to the exemplary embodiments depicted in the drawings, without this restricting the disclosure. In the figures.

DETAILED DESCRIPTION

Figure 1:
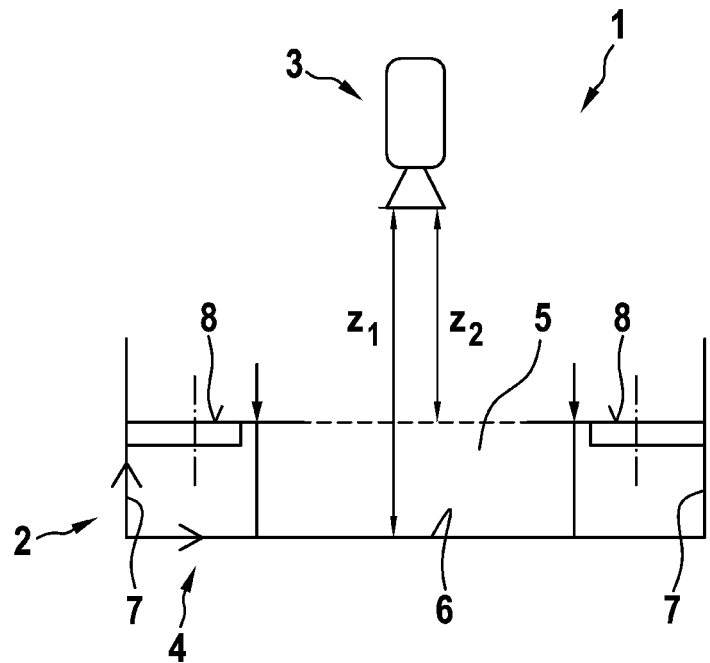
FIG. 1 shows a schematic illustration of a production device for producing a traction battery and a part of the traction battery.

FIG. 1 shows a schematic illustration of a production device 1 for producing a traction battery 2 and a part of this traction battery 2. More precisely, only a measuring device 3 is shown of the production device and only a battery housing 4 is shown of the traction battery 2. The battery housing 4 has at least one receptacle compartment 5 for receiving a cell module (not shown here). The receptacle compartment 5 is delimited at the bottom by a bottom 6 and in the lateral direction by walls 7. Support surfaces 8, on which the cell module is supported after it is arranged in the receptacle compartment 5, are formed on the walls 7. The support surfaces 8 are spaced apart far enough from the bottom 6 here that the cell module is spaced apart from the base 6 when it is supported on the support surfaces 8.

During the production of the traction battery 2, it is now provided that a first distance $z_1$ and a second distance $z_2$ are to be measured by means of the measuring device 3. The first distance $z_1$ describes a distance between the measuring device 3 and the bottom 6, whereas the second distance $z_2$ describes a distance between the measuring device 3 and the support surfaces 8. From the distance $z_1$ and the second distance $z_2$, a distance between the bottom 6 and the support surfaces 8 is then calculated. To measure the first distance $z_1$ and the second distance $z_2$, the measuring device 3 preferably has a camera, in particular a 3D camera.

Figure 2:
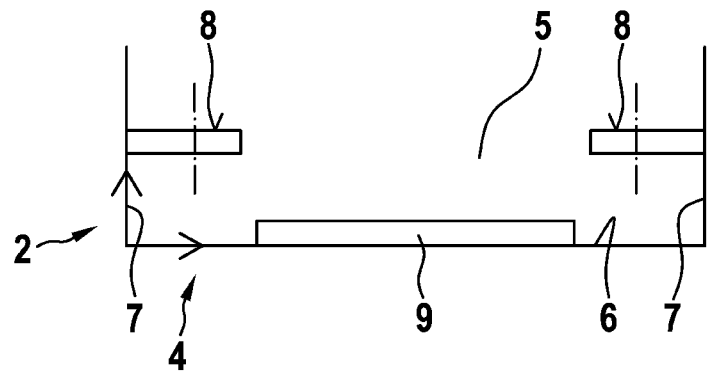
FIG. 2 shows a schematic illustration of the traction battery, wherein a heat conducting means is introduced into a receptacle compartment of a battery housing of the traction battery.

FIG. 2 shows a schematic illustration of a region of the traction battery 2 after application of heat conducting means 9 to the bottom 6 of the battery housing 4. A layer thickness of the heat conducting means 9 and thus an amount of the heat conducting means 9 to be applied was previously calculated from the distance between the bottom 6 and the support surfaces 8. The cell module (not shown) is then inserted into the receptacle compartment 5 so that it presses against the heat conducting means 9 or engages in it.

Due to the application of the amount of heat conducting means calculated from the distance to the bottom 6 of the battery housing 4, a significant saving in heat conducting means 9 is achieved in comparison to a procedure in which a generic amount of heat conducting means 9 is always applied. This is because both the production tolerances of the battery housing 4 and also the production tolerances of the cell module have to be taken into consideration for this generic amount. The former does not apply due to the use of the measured distance between the support surfaces 8 and the bottom 6. In order to compensate for measuring tolerances, however, it can also be provided here that an additional value is added to the measured distance, for example an additional value between 0.05 mm and 0.15 mm, preferably approximately or exactly 0.1 mm. In this way, a process-reliable application of the heat conducting means 9 to the bottom 6 of the battery housing 4 is ensured.

LIST OF REFERENCE SIGNS
1 production device
2 traction battery
3 measuring device
4 battery housing
5 receptacle compartment
6 bottom
7 wall
8 support surface
9 heat conducting means

The invention claimed is:

1. A method for producing a traction battery of a motor vehicle, comprising: receiving a cell module in a receptacle compartment in a housing of the traction batter, forming support surfaces for supporting the cell module spaced apart from a bottom of the battery housing on walls of the battery housing delimiting the receptacle compartment, measuring a distance between the support surfaces and the bottom, applying an amount of heat conducting medium calculated from the distance to the bottom, and inserting the cell module into the receptacle compartment with support on the support surfaces.

2. The method as claimed in claim 1, wherein the distance is measured by an optical measuring device.

3. The method as claimed in claim 2, wherein a camera is used as the measuring device.

4. The method as claimed in claim 2, wherein the distance is calculated from a first distance between the measuring device and the bottom and a second distance between the measuring device and the support surfaces.

5. The method as claimed in claim 1, wherein the amount is calculated from the distance and an area of the bottom.

6. The method as claimed in claim 1, wherein the application of the heat conducting medium is carried out by an application device moving at a specific speed over the bottom, wherein a heat conducting medium throughput of the application device is set in such a way that the calculated amount of heat conducting medium is applied to the bottom.

7. The method as claimed in claim 6, wherein the heat conducting medium throughput is set higher at a beginning and at an end of the application than between these times.

8. The method as claimed in claim 6, wherein the receptacle compartment is part of multiple receptacle compartments of the battery housing, wherein the distance between respective support surfaces and the bottom is measured and the amount of heat conducting medium is calculated separately for each of the receptacle compartments.

9. The method as claimed in claim 8, wherein a speed of the application device is set to be the same for the multiple receptacle compartments and the heat conducting medium throughput for each of the receptacle compartments is calculated and set separately from a respective required amount of heat conducting medium.

10. The method as claimed in claim 3, wherein the distance is calculated from a first distance between the measuring device and the bottom and a second distance between the measuring device and the support surfaces.

11. The method as claimed in claim 2, wherein the amount is calculated from the distance and an area of the bottom.

12. The method as claimed in claim 3, wherein the amount is calculated from the distance and an area of the bottom.

13. The method as claimed in claim 4, wherein the amount is calculated from the distance and an area of the bottom.

14. The method as claimed in claim 2, wherein the application of the heat conducting medium is carried out by an application device moving at a specific speed over the bottom, wherein a heat conducting medium throughput of the application device is set in such a way that the calculated amount of heat conducting medium is applied to the bottom.

15. The method as claimed in claim 3, wherein the application of the heat conducting medium is carried out by an application device moving at a specific speed over the bottom, wherein a heat conducting medium throughput of the application device is set in such a way that the calculated amount of heat conducting medium is applied to the bottom.

16. The method as claimed in claim 4, wherein the application of the heat conducting medium is carried out by an application device moving at a specific speed over the bottom, wherein a heat conducting medium throughput of the application device is set in such a way that the calculated amount of heat conducting medium is applied to the bottom.

17. The method as claimed in claim 5, wherein the application of the heat conducting medium is carried out by an application device moving at a specific speed over the bottom, wherein a heat conducting medium throughput of the application device is set in such a way that the calculated amount of heat conducting medium is applied to the bottom.

* * * * *